(12) United States Patent
Fukuda et al.

(10) Patent No.: US 11,416,741 B2
(45) Date of Patent: Aug. 16, 2022

(54) TEACHER AND STUDENT LEARNING FOR CONSTRUCTING MIXED-DOMAIN MODEL

(71) Applicant: INTERNATIONAL BUSINESS MACHINES CORPORATION, Armonk, NY (US)

(72) Inventors: Takashi Fukuda, Yokohama (JP); Osamu Ichikawa, Yokohama (JP); Samuel Thomas, Elmsford, NY (US); Bhuvana Ramabhadran, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1105 days.

(21) Appl. No.: 16/003,790

(22) Filed: Jun. 8, 2018

(65) Prior Publication Data

US 2019/0378006 A1 Dec. 12, 2019

(51) Int. Cl.
*G10L 15/06* (2013.01)
*G06N 3/08* (2006.01)
*G10L 15/02* (2006.01)

(52) U.S. Cl.
CPC ............... *G06N 3/08* (2013.01); *G10L 15/02* (2013.01); *G10L 15/063* (2013.01)

(58) Field of Classification Search
CPC .......... G10L 15/02; G10L 15/063; G06N 3/08
USPC ........................................................ 704/270
See application file for complete search history.

(56) References Cited

U.S. PATENT DOCUMENTS

| 5,960,391 | A | 9/1999 | Tateishi et al. |
| 9,558,742 | B2 | 1/2017 | Yu et al. |
| 10,699,697 | B2* | 6/2020 | Qian ..................... G10L 15/063 |
| 11,030,486 | B2* | 6/2021 | Bagherinezhad .... G06V 10/454 |
| 11,144,825 | B2* | 10/2021 | Liu .......................... G06N 3/08 |
| 2017/0083829 | A1 | 3/2017 | Kang et al. |
| 2017/0330586 | A1 | 11/2017 | Roblek et al. |
| 2018/0025721 | A1 | 1/2018 | Li et al. |
| 2018/0047413 | A1 | 2/2018 | Kurata |
| 2018/0158552 | A1 | 6/2018 | Liu et al. |

FOREIGN PATENT DOCUMENTS

CN 107657279 A 2/2018

OTHER PUBLICATIONS

Deng, "Recent Advances in Deep Learning for Speech Research at Microsoft", ICASSP 2013, May 2013, pp. 8604-8608.
(Continued)

*Primary Examiner* — Susan I McFadden
(74) *Attorney, Agent, or Firm* — Tutunjian & Bitetto, P.C.; Randall Bluestone

(57) ABSTRACT

A technique for constructing a model supporting a plurality of domains is disclosed. In the technique, a plurality of teacher models, each of which is specialized for different one of the plurality of the domains, is prepared. A plurality of training data collections, each of which is collected for different one of the plurality of the domains, is obtained. A plurality of soft label sets is generated by inputting each training data in the plurality of the training data collections into corresponding one of the plurality of the teacher models. A student model is trained using the plurality of the soft label sets.

24 Claims, 9 Drawing Sheets

(56) References Cited

OTHER PUBLICATIONS

You, "Improving Wideband Acoustic Models Using Mixed-bandwidth Training Data via DNN Adaptation", Interspeech 2014, Sep. 2014, pp. 2204-2208.
Li, "Improving Wideband Speech Recognition Using Mixed-Bandwidth Training Data in CD—DNN—HMM", 2012 IEEE Spoken Language Technology Workshop, Dec. 2012, p. 1-6.
Gao, "An Experimental Study on Joint Modeling of Mixed-Bandwidth Data via Deep Neural Networks for Robust Speech Recognition", 2016 International Joint Conference on Neural Networks, Jul. 2016, pp. 588-594.
International Search Report issued in PCT/IB2019/054523 dated Sep. 30, 2019, 9 pages.

* cited by examiner

TEACHER AND STUDENT LEARNING FOR CONSTRUCTING MIXED-DOMAIN MODEL

BACKGROUND

Technical Field

The present disclosure, generally, relates to machine learning, more particularly, to a computer implemented method, a computer system and a computer program product for constructing a model that supports a plurality of domains.

Description of the Related Art

In ASR (Automatic Speech Recognition) systems, narrowband and broadband systems are typically provided where the narrowband system mainly focuses on telephony speech and the broadband system is used for meeting transcription and a communication with a robot, etc. The terms "narrowband" and the "broadband" refer to the difference of the sampling frequency of the input speech signals. Conventionally, an acoustic model is constructed for each sampling frequency of the input speech signals even in the same support language. Therefore, a plurality of acoustic models is provided for each support language, requiring a huge amount of computational resources for operating a speech recognition system that supports plurality of sampling frequencies and workload for testing the system and for performing maintenance of the system.

Recently, neural network based acoustic models that work for both narrowband and broadband system with one shared model, so called mixed band acoustic models, have been developed. However, the mixed-band acoustic model hurts speech recognition performance for either of narrowband or broadband input, or both in comparison to the case where matched frontends and acoustic models are used.

Also such demand for supporting data of plurality of domains by a shared model without performance degradation in each domain may also arise in other models, such as image recognition models, motion recognition models, etc.

Therefore, there is a need for technique capable of constructing a mixed-domain model that supports a plurality of domains while suppressing performance deterioration in each domain.

SUMMARY

According to an embodiment of the present invention, a computer-implemented method for constructing a model that supports a plurality of domains is provided. The method includes preparing a plurality of teacher models, each of which is specialized for different one of the plurality of the domains. The method also includes obtaining a plurality of training data collections, each of which is collected for different one of the plurality of the domains. The method further includes inputting each training data in the plurality of the training data collections into corresponding one of the plurality of the teacher models to generate a plurality of soft label sets. The method includes further training a student model using the plurality of the soft label sets.

According to the method of the embodiment of the present invention, a mixed-domain model supporting the plurality of the domains can be constructed as the student model while suppressing performance deterioration of the mixed-domain model in each domain. The constructed model can replace a plurality of existing models that have been prepared to support the plurality of the domains, without giving much negative impact, thereby, reducing computational resources for operating the system that supports the plurality of the domains and workload for testing the system and performing maintenance of the system.

In a preferable embodiment, each teacher model is connected to a matched feature extractor for corresponding one of the plurality of the domains and the student model is connected to a unified feature extractor that is common at least partially to the plurality of the domains. Thereby, even though different feature extraction process is required for each domain, the mixed-domain model that supports the plurality of the domains can be constructed preferably.

In further preferable embodiment, the matched feature extractor of each teacher model extracts a matched feature from an input signal in the corresponding one of the plurality of the domains. The preparing of the plurality of the teacher models includes training each teacher model using the matched features extracted by the matched feature extractor from teacher training data for the corresponding one of the plurality of the domains. Since the feature extractor well matched to the corresponding domain can be used to train each teacher model, the performance of the constructed model can be improved in comparison with a case where a feature extractor not well matched to the corresponding domain is used.

In further other preferable embodiment, the unified feature extractor of the student model extracts an unified feature from an input signal in any one of the plurality of the domains by unifying physical meanings of features between the plurality of the domains. Since the physical meanings of the features are unified between the domains at the unified feature extractor connected to the student model, the student model can process features that correlate with data of the plurality of the domains. On the other hand, impact of unifying the physical meanings of the features can be compensated by the soft labels that are generated by the teacher models that use respective matched feature extractors.

In another preferable embodiment, the unified feature extractor of the student model includes a hybrid normalization parameter set that is used in common for the plurality of the domains. Thereby, the performance of the mixed-domain model can be improved in comparison with a case where a dedicated normalization parameter set is used for each domain.

In a particular embodiment, the plurality of the teacher models and the student model are acoustic models and the plurality of the domains has difference in sampling condition of an input speech signal. Thereby, a mixed model supporting the plurality of the sampling condition can be constructed while suppressing performance deterioration in each sampling condition. Computational resources for operating the speech recognition system that supports the plurality of the sampling condition can be reduced. Also workload for testing the system and performing maintenance of the system can be reduced.

In other particular embodiment, the plurality of the teacher models and the student model are image processing models and the plurality of the domains has difference in color modes of an input image signal. Thereby, a mixed model supporting the plurality of the color modes can be constructed while suppressing performance deterioration in each color mode.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The following description will provide details of preferred embodiments with reference to the following figures wherein.

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for constructing a model that supports a plurality of domains in a complementary relationship by using data obtained from a plurality of teacher models, each of which is specialized for different one of the support domains, in a framework of teacher and student learning.

First, with reference to the series of FIGS. 1-6, a computer system and a computer-implemented method for constructing a mixed-band model for speech recognition that supports a plurality of sampling conditions according to exemplary embodiments of the present invention will be described. Then, with reference to the series of FIGS. 7 and 8, a computer system and a computer-implemented method for constructing a mixed-color model for image recognition that supports a plurality of color modes according to other exemplary embodiments of the present invention will be described. Finally, referring to FIG. 9, a hardware configuration of a computer system according to one or more embodiments of the present invention will be described.

Hereinafter, referring to the series of FIGS. 1-6, a mixed-band model construction system and a method for constructing a mixed-band model that can be used for speech recognition according to an exemplary embodiment of the present invention are described.

Figure 1:
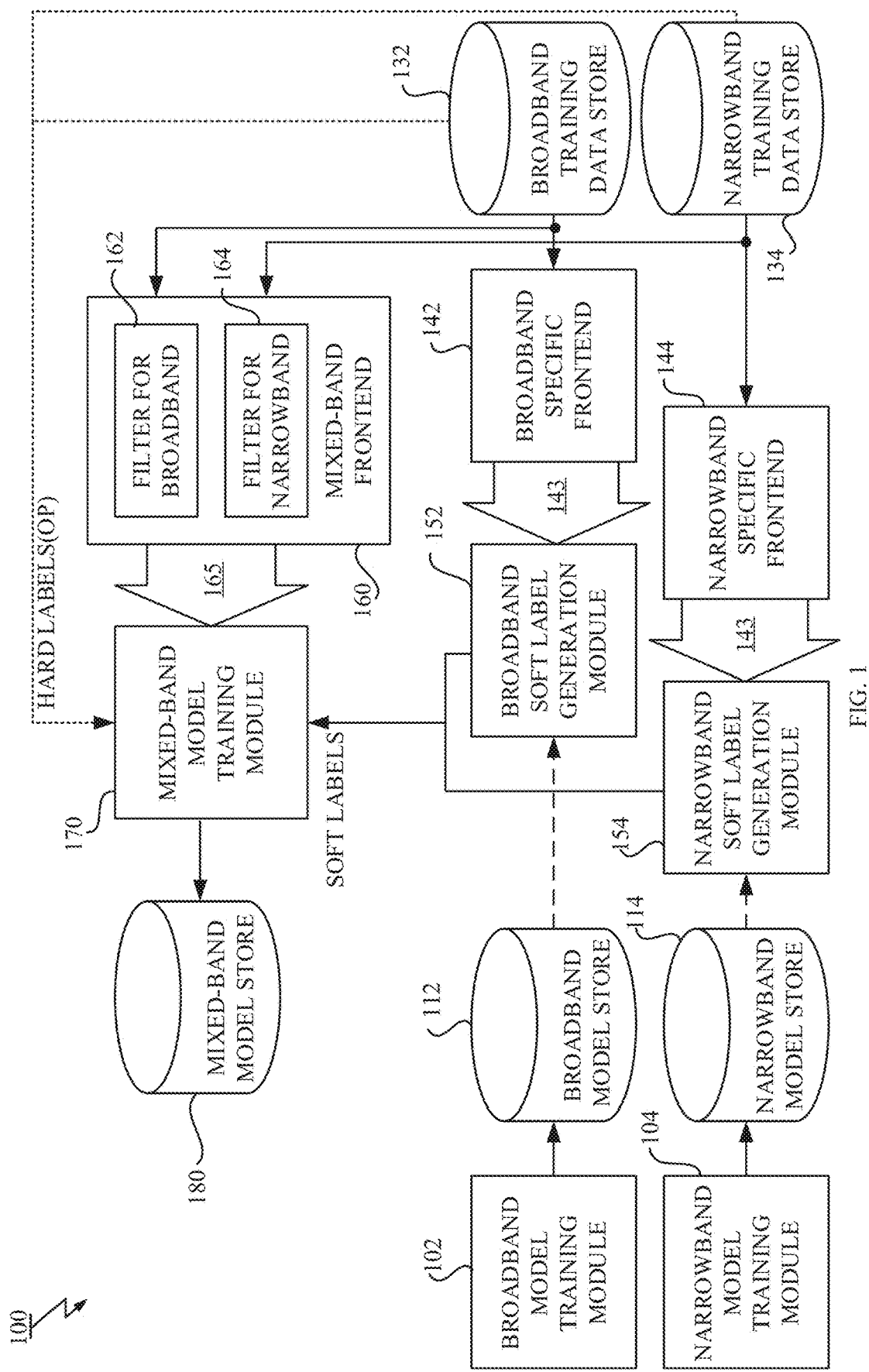
FIG. 1 illustrates a block diagram of a mixed-band model construction system for speech recognition according to an exemplary embodiment of the present invention.

FIG. 1 illustrates a block diagram of a mixed-band model construction system 100 for the speech recognition. The mixed-band model construction system (Hereinafter, simply referred to as "model construction system") 100 is a computer system that constructs a mixed-band model for the speech recognition in a framework of teacher and student learning where teacher models are used to generate soft labels and a student model is trained using the soft labels generated by the teacher models.

In the speech recognition, a neural network (NN) model is typically used for an acoustic model to produce a probability distribution over HMM (Hidden Markov Model) states from a speech (audio) signal. The speech signal is typically digitalized by sampling an audio analog signal at a predetermined sampling frequency. There is a plurality of audio types, typically including narrowband and broadband (also called wideband) speech signal, where the terms "narrowband" and "broadband" refer to the difference of the this sampling frequency. Depending on how much frequency range is sampled, it is determined whether it is narrowband or broadband.

Traditionally, an acoustic model for speech recognition is prepared for each sampling frequency of the input speech signal in one support language. In contrast to the conventional system, the model construction system 100 according to the exemplary embodiment is configured to train a mixed-band model that is capable of handling input signals in both of the broadband and narrowband systems.

For this purpose, there are plurality of lines, including broadband and narrowband lines, to generate soft labels that are used to train the mixed-band model, as illustrated in FIG. 1.

More specifically, the model construction system 100 includes, as the broadband line, a broadband model training module 102 that trains a broadband model as one of the teacher models; a broadband model store 112 that is used for storing the trained broadband model; a broadband training data store 132 that stores a collection of broadband training data; a broadband specific frontend 142 that extracts acoustic features specifically matched to broadband inputs; and a broadband soft label generation module 152 that generates a set of soft labels that can be used to train the mixed-band model together with the corresponding collection of the broadband training data.

As the narrowband line, the model construction system 100 also includes a narrowband model training module 104 for training a narrowband model as one of the teacher models; a narrowband model store 114 used for storing the trained narrowband model; a narrowband training data store 134 for storing a collection of narrowband training data; a narrowband specific frontend 144 for extracting acoustic features specifically matched to narrowband inputs; and a narrowband soft label generation module 154 for generating a set of soft labels that can be used to train the mixed-band model together with the corresponding collection of the narrowband training data.

The model construction system 100 according to the exemplary embodiment of the present invention further includes a mixed-band frontend 160 that extracts unified acoustic features from both of the broadband and narrowband training data stored in the training data stores 132, 134; a mixed-band model training module 170 that trains a student model as the mixed-band model by using the soft label sets that are generated by the soft label generation modules 152, 154; and a mixed-band model store 180 that is used for storing the mixed-band model trained by the mixed-band model training module 170.

Figure 2:
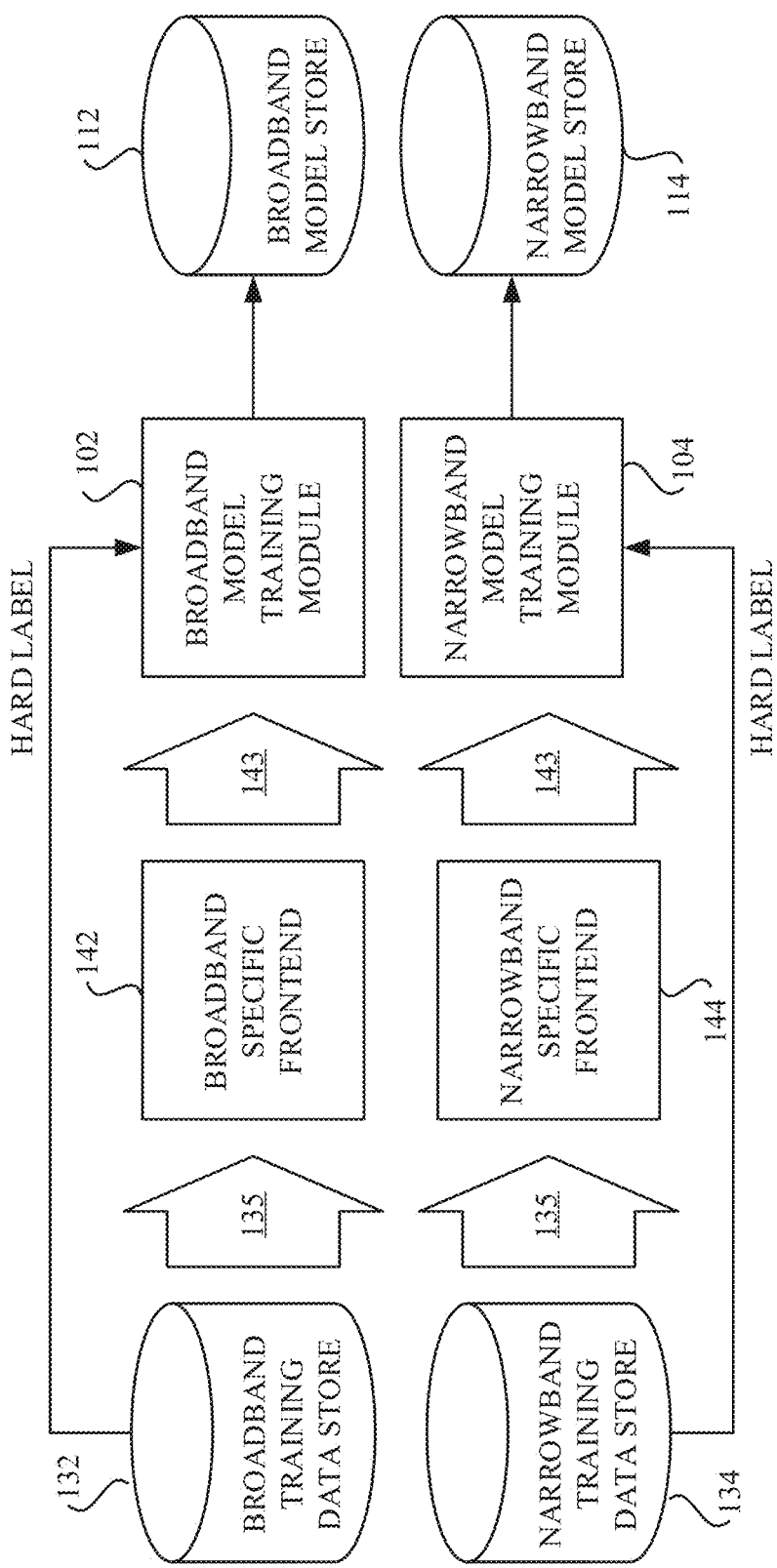
FIG. 2 describes a way of training broadband and narrowband models as teacher models according to a particular embodiment of the present invention.

The broadband and narrowband model training modules 102, 104 are configured to train broadband and narrowband models specialized for the broadband and narrowband systems, respectively, to prepare the teacher models. Referring to FIG. 2, a way of training the broadband and narrowband models as the teacher models is described.

In FIG. 2, there are the broadband and narrowband training data stores 132, 134; the broadband and narrowband specific frontends 142, 144, the broadband and narrowband model training modules 102, 104, and the broadband and narrowband model stores 112, 114.

The broadband and narrowband training data stores 132, 134 are configured to store collections of training data collected for the broadband and narrowband systems, respectively. Each training data includes a speech signal 135 of either the broadband or narrowband system, which may carry an utterance of a speaker, and a transcription corresponding to the utterance in the speech signal. The transcription is typically transcribed by human experts or automatic transcription software.

The broadband and narrowband specific frontends 142, 144 are matched feature extractors specialized for the broadband and narrowband systems, respectively. The broadband specific frontend 142 is configured to extract a series of frames of acoustic features matched to the broadband system from the speech signal 135 of each broadband training data stored in the broadband training data store 132. Similarly, the narrowband specific frontend 144 is configured to extract a series of frames of acoustic features matched to the narrowband system from the speech signal 135 of each narrowband training data stored in the narrowband training data store 134.

In one or more embodiments, the acoustic features may include, but not limited to, MFCC (Mel Frequency Cepstral Coefficient), Mel-scaled spectrogram with no cosine transforms, raw FFT spectrogram, LPC (Linear Predictive Coding) Coefficient, PLP (Perceptual Liner Prediction) Cepstral Coefficient, or any combinations thereof. The acoustic features may further include dynamical features such as delta features and delta-delta features of the aforementioned acoustic features.

The speech signal of the broadband training data stored in the broadband training data store 132 is fed into the broadband specific frontend 142. Then, the acoustically well matched features 143 extracted by the broadband specific frontend 142 are fed into the broadband model training module 102. The transcription of the broadband training data stored in the broadband training data store 132 can be used to generate a hard label that indicates one of the HMM class set aligned to each frame of the acoustic feature by standard forced alignment technique. The hard label aligned to each frame of the acoustic feature is passed to the broadband model training module 102 and the broadband model training module 102 is configured to train a broadband model by using the acoustically well matched features and the hard labels.

Similarly, the speech signal of the narrowband training data stored in the narrowband training data store 134 is fed into the narrowband specific frontend 144 and the acoustically well matched features 143 extracted by the narrowband specific frontend 144 are fed into the narrowband model training module 104. The transcription of the narrowband training data stored in the narrowband training data store 134 is used to generate a hard label for each frame of the acoustic feature. The narrowband model training module 104 is configured to train a narrowband model by using the acoustically well matched features and the hard labels.

Each of the broadband and narrow models may include a single model or an ensemble of plural sub-models. The single model or each sub-model in the ensemble may be any one of standard neural networks, which includes DNN (Deep Neural Network), CNN (Convolutional Neural Network), RNN (Recurrent Neural Network) based models and a neural network model combining features of several neural network types. In a particular embodiment, each of the broadband and narrowband models may include, but not limited to, a VGG model (developed by Visual Geometry Group (VGG) in University of Oxford), a LSTM (Long Short-Term Memory) and a ResNet (Deep Residual Network), independently. Furthermore, a model that is trained by using soft labels obtained from the model trained with the hard labels in a framework of teacher and student learning can be also used as one of the teacher models for training the mixed-band model.

Parameters, including weights and biases, of the broadband model trained by the broadband model training module 102 are stored in the broadband model store 112. Parameters of the narrowband model are stored in the narrowband model store 114.

Referring back to FIG. 1, the broadband and narrowband specific frontends 142, 144 preceding the broadband and narrowband soft label generation modules 152, 154 may be same as those used to train the broadband and narrowband models in FIG. 2, respectively. The broadband and narrowband specific frontends 142, 144 are configured to extract an acoustic feature matched to the broadband and narrowband systems from each training data stored in the training data stores 132, 134, respectively. The extracted acoustic features are fed into the corresponding soft label generation modules 152, 154.

The broadband soft label generation module 152 is configured to generate a set of soft labels by inputting, through the broadband specific frontend 142, each training data stored in the broadband training data store 132 into the corresponding broadband teacher model that is loaded from the broadband model store 112. Similarly, the narrowband soft label generation module 154 is configured to generate a set of soft labels by inputting, through the narrowband specific frontend 144, each training data stored in the narrowband training data store 134 into the corresponding narrowband teacher model loaded from the narrowband model store 114.

The mixed-band frontend 160 is an unified feature extractor that extracts an unified feature 165 from a broadband or narrowband input speech signal. The mixed-band frontend 160 is at least partially common to the broadband and narrowband systems.

The mixed-band frontend 160 shown in FIG. 1 includes a first filter 162 for the broadband system and a second filter 164 for the narrowband system. Since the mixed-band model is a model that can be shared for both of the broadband and narrowband systems, the mixed-band frontend 160 absorbs partially such difference between the broadband and narrowband speech signals by using these filters 162, 164 in terms of sampling conditions.

Figure 3:
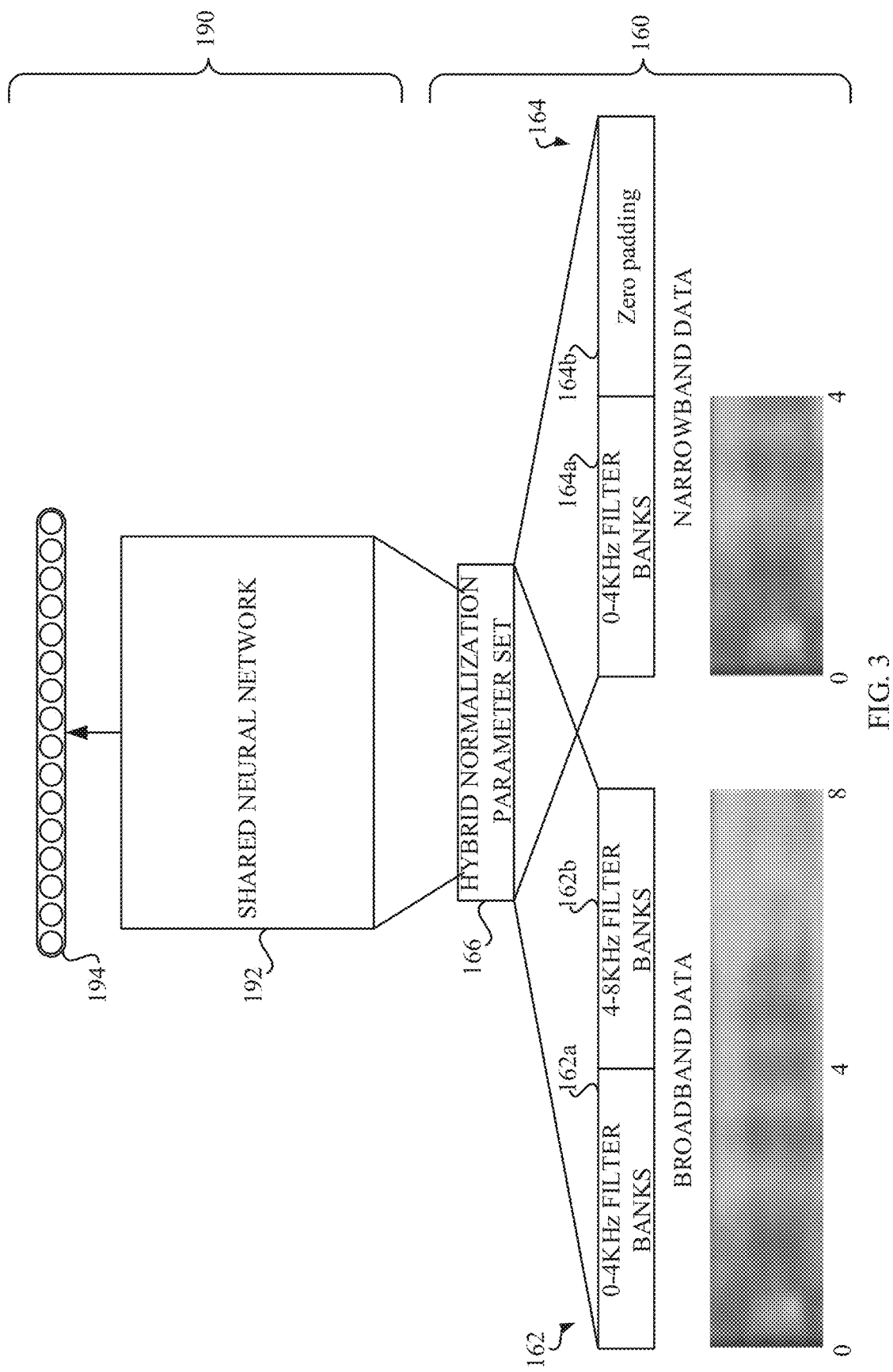
FIG. 3 depicts a schematic of a mixed-band frontend and a subsequent mixed-band model according to a particular embodiment of the present invention.

With reference to FIG. 3, a schematic of a mixed-band frontend according to a particular embodiment of the present invention is described together with a subsequent mixed-band model. As shown in FIG. 3, there is the mixed-band frontend 160 that includes the first filter 162 and the second filter 164 in connection to the subsequent mixed-band model 190.

The first filter 162 has coefficients of Mel filter banks for the broadband system. Whereas the second filter 164 has coefficients of Mel filter banks for the narrowband system. Note that the particular embodiment shown in FIG. 3 is an embodiment where outputs of the Mel filter banks with no cosine transforms are used as the acoustic features.

The mixed-band frontend 160 is configured to extract the unified features 165 from an input signal in the broadband or narrowband system by using the first and second filters 162, 164 so as to unify physical meanings of features between the broadband and narrowband systems.

The first filter 162 has a full set of filter banks so that the unified feature 165 (feature vector, to be more accurate) extracted from the broadband speech signal has a plurality of elements corresponding to a full range of frequency (0-8 kHz). On the other hand, the second filter 164 has a first set of filter banks 164*a* for low frequency range (0-4 kHz) and a second set of filter banks 164*b* for high frequency range (4-8 kHz) with zero padding. For convenience, two parts of the filter banks of the first filter 162 corresponding to the low and high frequency ranges are referred to as low and high frequency parts 162*a*, 162*b*, respectively. The unified feature 165 (feature vector) extracted from the narrowband speech signal has a half part of elements that physically corresponds to the part generated by the low frequency part 162*a* of the first filter 162 and a remaining half part of elements that corresponds to the part generated by the high frequency part 162*b* of the first filter 162.

Thus, the first and second filter 162, 164 are designed in such that the broadband data is treated as it is and the narrowband data can be treated as broadband data with higher frequency part of the feature missing. Note that the division position on which one part of the elements of the feature vector is padded with zero is described to be just half the position in the FIG. 3: however, the division position may be located at a position biased towards one side.

As shown in FIG. 3, the mixed-band frontend 160 according to the particular embodiment includes further a hybrid normalization parameter set 166 that is used in common to the broadband and narrowband systems. The hybrid normalization parameter set 166 may be a CMN or CMS (Cepstral Means Normalization/Subtraction) coefficient that compensates multiplication distortion in the feature vector. The mean vector may be calculated for each unit after the Mel filter bank calculation. Such unit may include a unit of utterance, a unit of speaker, whole of training data, to name but a few.

Note that the hybrid normalization parameter set 166 is preferably used in common to the broadband and narrowband systems from the viewpoint of improving the performance of the model. However, in other embodiments, normalization parameter sets dedicated for each sampling condition may also be contemplated.

Referring back to FIG. 1, a training data stored in the broadband or narrowband training data store 132/134 is fed into the corresponding teacher model via the corresponding band-specific frontend 142/144 to generate a set of outputs as the soft labels, which are then fed into the mixed-band model training module 170. Meanwhile, the same training data is fed into the mixed-band model training module 170 via the mixed-band frontend 160 to train the student model by using the generated soft labels, as privileged information. The privileged information is privileged in a sense that it is merely available during the training phase.

The mixed-band model training module 170 is configured to train the student model as the mixed-band model in the framework of the teacher and student learning. The teacher and student learning is a process of training a student model by leveraging soft labels obtained from one or more teacher models with/without a hard label.

The mixed-band model training module 170 receives a set of the unified acoustic features 165, each of which is extracted by the mixed-band frontend 160 from each training data, and a set of the soft labels, each of which is generated by the soft label generation modules 152, 154 from each of the same training data. The mixed-band model training module 170 trains the student model by using the unified acoustic feature 165 and the soft label associated with the unified acoustic feature 165. The unified feature 165 and the soft label obtained from each training data are used as an input to the student model and the privileged information, respectively.

In a particular embodiment, the mixed-band model training module 170 may receive further hard labels for each training data, and train the student model by using the hard labels together with the soft labels.

Note that the student model may not have been trained yet before the training process of the mixed-band model training module 170 and would be trained by the mixed-band model training module 170 from scratch. Alternatively, the student model may have been trained to some extent in advance and would be additionally trained by the mixed-band model training module 170. In further other embodiment, the teacher and student learning using the soft labels can be used as pre-training for the student model to provide a better starting point, followed by a fine-tuning process.

Referring again to FIG. 3, the mixed-band model 190 includes a shared neural network 192 followed by an output layer 194. The shared neural network 192 may be any one of standard neural networks, which includes DNN, CNN, RNN based models and a neural network combining features of several neural network types. In one or more embodiments, the shared neural network 192 has a different structure from the teacher models. In the exemplary embodiment, the shared neural network 192 is smaller and simpler than the teacher models. However, a model larger and/or more complex than the teacher models may not be excluded from the models for the mixed-band model 190.

The output layer 194 of the mixed-band model 190 outputs a probability distribution over HMM states based on activations of the hidden layers in the shared neural network 192. The HMM states may correspond to clusters of context-dependent phoneme states, or simply context-independent phoneme states. One of the context dependent models is a quinphone model where each distinct phone model for every different two left and two right phone contexts is used.

The number of the members in the class set for the mixed-band model 190 and the members in the class set are typically same as those of the teacher models. However, the number of the members in the class set for the mixed-band model 190 and/or its members may be different from that of the teacher models as long as it is possible to solve the inconsistency between the mixed-band model 190 and the teacher models by using appropriate technique. Such technique may include class pairs mapping technique in which a mapping of classes between the teacher model and the student model are calculated and a set of soft labels for the student side class set are calculated from the set of the outputs obtained from the teacher model based on the mapping. Note that, in the described embodiment, it is assumed that the classes for the student model belong to a phoneme system of a language that is same as that of the teacher models.

In particular embodiments, each of modules 102, 104, 142, 144, 152, 154, 160, 170 of the construction system 100 described in FIG. 1 and FIG. 2 may be, but not limited to, implemented as a software module including program instructions and/or data structures in conjunction with hardware components such as a processing circuitry (e.g., CPU (Central Processing Unit), GPU (Graphic Processing Unit), FPGA (Field Programmable Gate Array)), a memory, etc.; as a hardware module including electronic circuitry (e.g., neuromorphic chip); or as a combination thereof. These modules 102, 104, 142, 144, 152, 154, 160, 170 described in FIG. 1 and FIG. 2 may be implemented on a single computer system such as a personal computer and a server machine or a computer system distributed over a plurality of computing devices such as a computer cluster of the computing devices. Also the data and model stores 112, 114, 132, 134, 180 may be provided by any memory device including a RAM, SSD, HDD, etc., as long as it can be accessed by the module requiring access.

Note that the broadband and narrowband teacher models are not necessary to be located on a local of a computer system that implements other modules of the construction system 100. It is sufficient if the broadband and narrowband teacher models are available through a network. Thus, preparing the teacher models means making the teacher models available by reading the teacher models onto a memory space of the local computer system; or establishing a connection with the teacher model that operates on a remote computer system such that the training data can be fed into the teacher model and a result for the training data can be received from the teacher model.

Also note that the training data for training the broadband model may be same as or different from the training data used for generating the soft label and for training the mixed-band model. Also, the training data for training the narrowband model may be same as or different from the training data that is used for generating the soft label and for training the mixed-band model.

Figure 4:
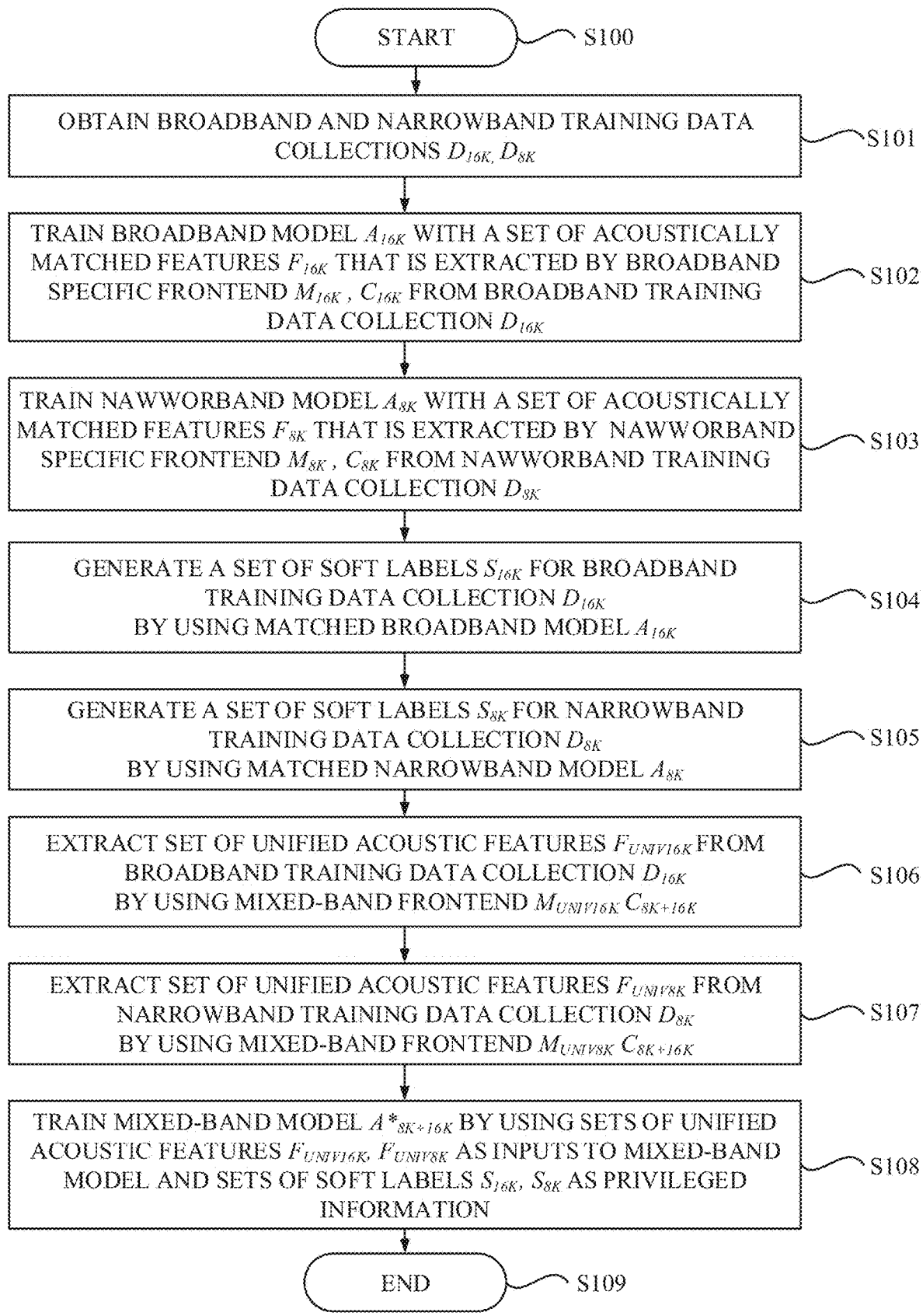
FIG. 4 is a flowchart depicting a process for constructing a mixed-band model for an acoustic model according to an exemplary embodiment of the present invention.
Figure 5:
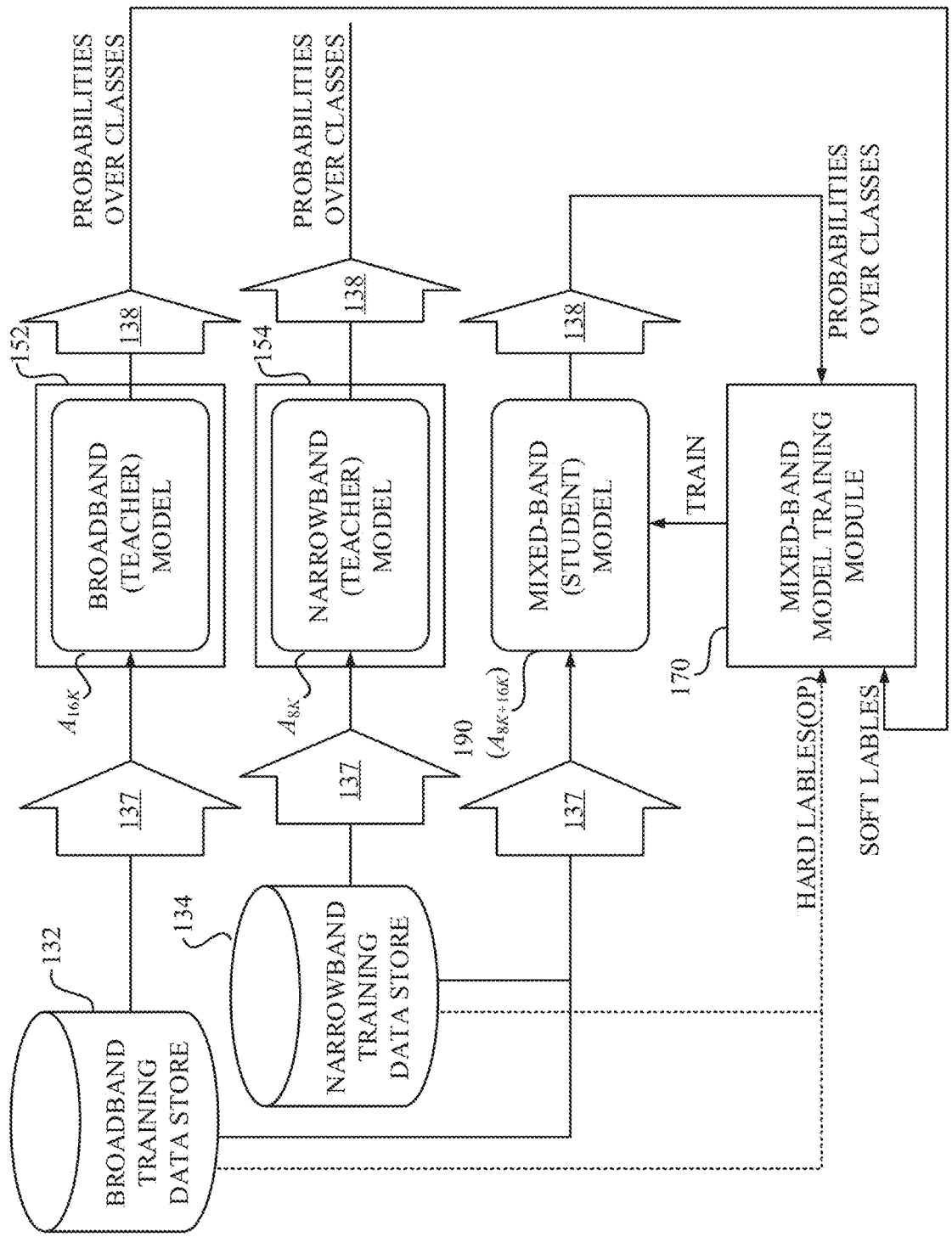
FIG. 5 describes a schematic of a teacher and student learning framework for constructing the mixed-band model according to the exemplary embodiment of the present invention.

With reference to FIG. 4 and FIG. 5, a process for constructing a mixed-band model for an acoustic model according to an exemplary embodiment of the present invention is described. FIG. 4 is a flowchart depicting the process for constructing the mixed-band model for the acoustic model. FIG. 5 describes a schematic of a teacher and student learning framework for constructing the mixed-band model.

As shown in FIG. 4, the process may begin at step S100 in response to receiving, from an operator, a request for initiating a construction process, for example. Note that the process shown in FIG. 4 may be performed by processing circuitry such as one or more processing units.

At step S101, the processing circuitry may obtain broadband and narrowband training data collections $D_{16K}$, $D_{8K}$, each of which is collected for either one of the broadband and the narrowband systems. The training data collections $D_{16K}$, $D_{8K}$ stored in the training data stores 132, 134 may be designated in the request.

At step S102, the processing circuitry may train the broadband model $A_{16K}$ with a set of acoustically matched features $F_{16K}$ that is extracted by the broadband specific frontend 142 having the Mel filter banks $M_{16K}$ and the broadband specific normalization parameter set $C_{16K}$ from the broadband training data collection $D_{16K}$ obtained at the step S101 to prepare one teacher model specialized or dedicated for the broadband system.

At step S103, the processing circuitry may train the narrowband model $A_{8K}$ with a set of acoustically matched features Fax that is extracted by the narrowband specific frontend 144 having the Mel filter banks Max and the narrowband specific normalization parameter set $C_{8K}$ from the narrowband training data collection $D_{8K}$ obtained at the step S101 to prepare one teacher model specialized or dedicated for the narrowband system.

Note that the term "specialized" or "dedicated" for a particular audio system means that it is advantageous for the particular audio system compared to other audio system. For examples, the fact that it can handle data of the narrowband system itself represents the advantage for the narrowband system. The fact that the performance for the narrowband system is higher than the performance for the broadband system represents the advantage for the narrowband system, too.

At step S104, the processing circuitry may generate a set of soft labels $S_{16K}$ for the broadband training data collections $D_{16K}$ by using the matched broadband model $A_{16K}$ trained at the step S102.

At step S105, the processing circuitry may generate a set of soft labels $S_{8K}$ for the narrowband training data collections $D_{8K}$ by using the matched narrowband model $A_{8K}$ trained at the step S103.

As shown in FIG. 5, by inputting feature vectors 137 from each training data stored in the broadband or narrowband training data store 132/134 through the corresponding band-specific frontend 152/154, the corresponding teacher model $A_{16K}/A_{8K}$ may outputs probabilities over the classes of HMM states. The outputs 138 generated by the corresponding teacher model $A_{16K}/A_{8K}$ for each training data stored in the corresponding training data store 132/134 constitute soft labels for feature vectors 137 from each training data. In the described embodiment, the outputs 138 obtained from the corresponding teacher model $A_{16K}/A_{8K}$ are called as 'soft' labels since the class identities are not as deterministic as the original one hot hard label.

At step S106, the processing circuitry may extract a set of unified acoustic features $F_{UNIV16K}$ from the broadband training data collection $D_{16K}$ by using the mixed-band frontend 160 having the unified Mel filter banks $M_{UNIV16K}$ and the hybrid normalization parameter set $C_{8K+16K}$.

At step S107, the processing circuitry may extract a set of unified acoustic features $F_{UNIV8K}$ from the narrowband training data collection $D_{8K}$ by using the mixed-band frontend 160 having the unified Mel filter banks $M_{UNIV8K}$ and the hybrid normalization parameter set $C_{8K+16K}$.

At step S108, the processing circuitry may train the mixed-band model $A_{8K+16K}$ by using the sets of the unified acoustic features $F_{UNIV16K}$, $F_{UNIV8K}$ as inputs to the mixed-band model and the sets of the soft labels $S_{16K}$, $S_{8K}$ as privileged information.

As shown in FIG. 5, by inputting each training data stored in the broadband or narrowband training data store 132/134 through the mixed-band frontend 160, the mixed-band student model 190 ($A_{8K+16K}$) may outputs probabilities over the classes of the HMM states. The soft labels obtained from the corresponding teacher model $A_{16K}/A_{8K}$ are compared with the outputs obtained from the mixed-band student model 190.

Training criteria that minimize the differences in distributions between the student and teacher models can be employed. In a particular embodiment, cross entropy criteria may be employed, where a cost function used for training the mixed-band student model 190 ($A_{8K+16K}$) is represented as follow:

$$\mathcal{L}(\theta) = -\sum_i q_i \log p_i$$

where $q_i$ represents the soft label generated by the broadband and narrowband teacher models for each class i, which works as a pseudo label, and $p_i$ represents output probability for each class i. In a particular embodiment, the hard label and the soft labels are used alternately to update the parameters of the mixed-band student model 190 during the training process.

In the teacher and student learning framework, at least soft labels calculated by feeding the acoustic feature into the teacher model are used. Although the hard label given for each training data can be used to improve the performance of the student model, it is not necessary to use the hard label to train the mixed-band student model 190. Thus, in other embodiment, unlabeled training data may be used to train the mixed-band student model 190. However, the training criteria as well as the way of using the soft labels in the training may not be limited to the aforementioned examples. The soft labels can be used in a various criteria and ways to train the student model.

After performing the training process at S108, the process may proceed to step S109 and end at the step S109. The parameters of the mixed-band student model 190 ($A_{8K+16K}$), which may include weights between each units and biases of each unit in the neural network, are optimized during the process so as to classify the input correctly and the finally obtained parameters of the mixed-band student model 190 ($A^*_{8K+16K}$) are stored in the mixed-band model store 180.

Figure 6:
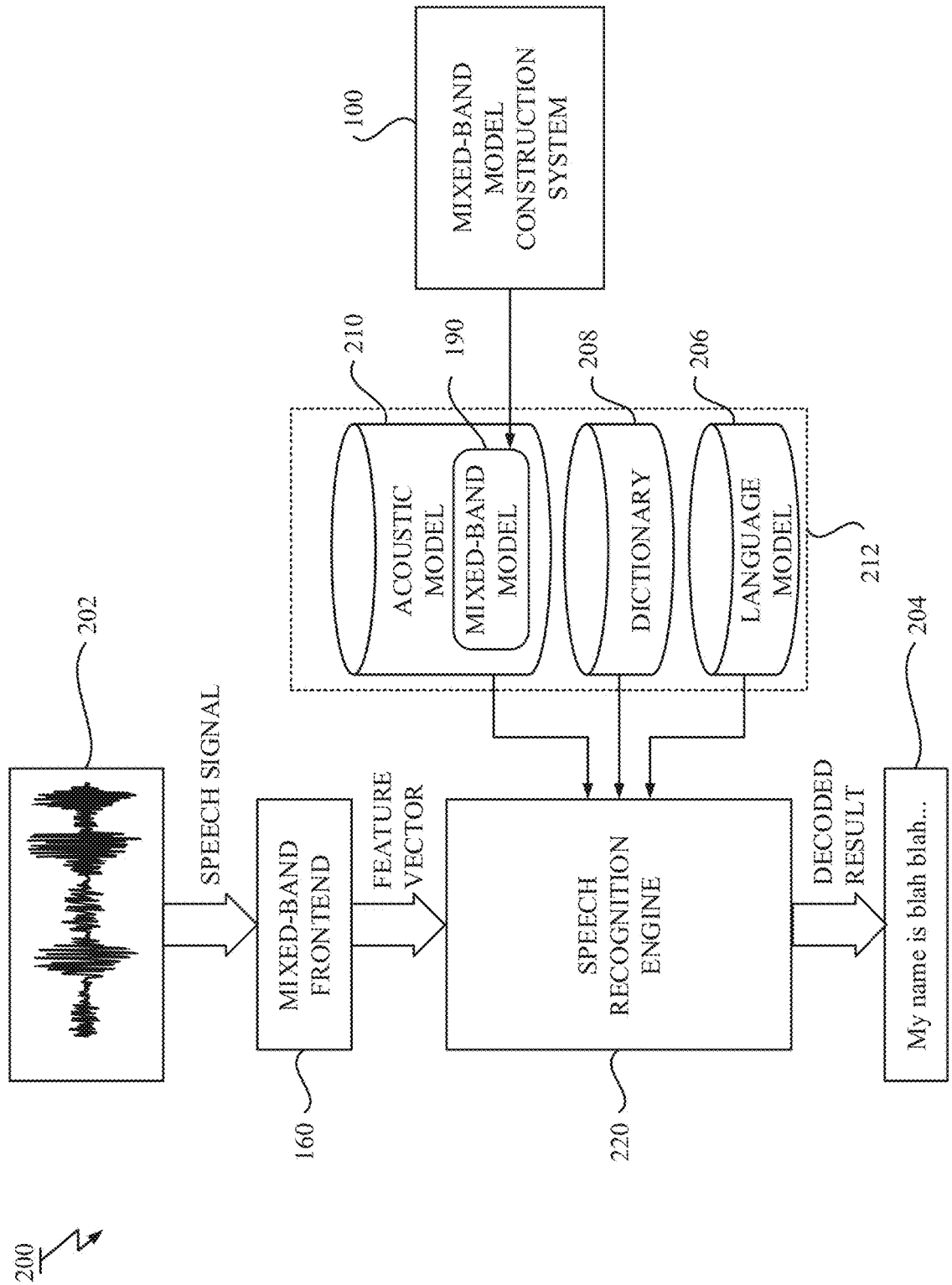
FIG. 6 illustrates a block diagram of a speech recognition system that includes the mixed-band model construction system according to the exemplary embodiment of the present invention.

With reference to FIG. 6, an overall picture of a speech recognition system that includes the model construction system 100 is described.

FIG. 6 illustrates a block diagram of a speech recognition system 200 that includes the model construction system 100 shown in FIG. 1. As shown in FIG. 6, the speech recognition system 200 may include the aforementioned mixed-band frontend 160 that receives an speech signal 202 of the broadband or narrowband system and extracts an unified acoustic feature from the received speech signal 202; a speech recognition engine 220 that receives the extracted acoustic feature and outputs a decoded result 204 based on given speech recognition models 212; and the aforementioned model construction system 100. The speech signal may be provided as an audio file, an audio stream from an input device such as a microphone, or an audio stream via a network socket.

The speech recognition engine 220 receives the sequence of the extracted acoustic features and predicts most plausible speech contents based on the speech recognition models 212.

The speech recognition models 212 may include a language model 206, a dictionary 208 and an acoustic model 210. The language model 206 is a model representing probability distribution of word sequence and may be, but not limited to, n-gram model or neural network based model such as RNN LM (Language Model). The acoustic model 210 is a model representing relationship between input acoustic features and sub-word units constituting a speech. The dictionary 208 describes mappings between each word and corresponding sub-word. Among the speech recognition models 212, the acoustic model 210 may be a target of the novel model construction technique according the exemplary embodiment of the present invention.

In a particular embodiment, the acoustic model 210 may be a hybrid NN (Neural Network)-HMM model, where the neural network is used to directly compute observation probability distribution over HMM states instead of a standard Gaussian Mixture Models (GMM) in the GMM/HMM system. However, the acoustic model is not limited to the aforementioned hybrid NN-HMM model. In other embodiment, the acoustic model may be other type of NN-HMM model that is based on tandem or "bottleneck feature" approach, where the neural network is used to extract features as input for a subsequent system such as a standard GMM/HMM system, NN/GMM/HMM system and other neural network based system having different architecture or structure from the neural network, in place of or in addition to standard acoustic features.

Thus, the mixed-band model 190 trained by the mixed-band model construction system 100 can be used in the acoustic model 210 at least in part. The probability distribution output from the mixed-band model 190 can be passed to the HMM after appropriate computation. Alternatively, features extracted from the mixed-band model 190 can be passed as an input to a subsequent acoustic model such as a standard GMM/HMM system.

The speech recognition engine 220 finds a word sequence with maximum likelihood based on the sequence of the acoustic features obtained from the mixed-band frontend 160 by integrating the language model 206 and the acoustic model 210, and outputs the word sequence found as the decoded result 204.

In standard teacher and student learning (a. k. a. knowledge distillation) techniques, there is an implicit assumption that input layers between the student and the teacher models are identical. However, the input layers may be different depending on the sampling condition of the speech signal. It is quite resource-consuming to build both models for each sampling condition.

According to one or more embodiments of the present invention, although it does not necessarily mean that the same is hold in all the embodiments, it is possible to construct a mixed-band model supporting a plurality of sampling conditions by leveraging knowledge obtained from teacher models that are specialized for respective sampling conditions while suppressing performance deterioration of the mixed-band model in each band. The training data for one sampling condition contributes to improvement of performance on other sampling condition in a complementary manner. Thus, even if the training data for one sampling condition is biased, it is possible to alleviate such bias by using the training data for other sampling condition.

Furthermore, the constructed model can replace a plurality of existing models that have been prepared to support the plurality of the sampling conditions, without giving much negative impact such as performance degradation in a particular sampling condition. Thereby, computational resources for operating the system that supports the plurality of the sampling conditions can be reduced. Furthermore, workload for testing the system and performing maintenance of the system can also be reduced. Also, from the viewpoint of the user, selection of the sampling conditions becomes unnecessary.

In the preferable embodiment with the band-specific frontends 142, 144 and the mixed-band frontend 160, even though different feature extraction process is required for each sampling condition, the novel technique can be applicable.

In the further preferable embodiment where each teacher model is trained by using matched features extracted from teacher training data, the performance of the constructed model can be improved in comparison with a case where a feature extractor not well matched to the corresponding sampling condition is used since the feature extractor best fit to the corresponding sampling condition can be used to train each teacher model and accordingly the teacher model can be trained in the best conditions.

In the preferable embodiment where the physical meanings of the features are unified between the sampling conditions at the mixed-band frontend 160, the student model can process features that correlate with data of the plurality of the sampling conditions. On the other hand, impact of unifying the physical meanings of the features can be compensated by the soft labels that are generated by the teacher models that use the band-specific frontends 142, 144. Rather, a synergistic effect by using a plurality of training data collections together is obtained for both sampling conditions.

In the preferable embodiment with the hybrid normalization parameter set 166, the performance of the mixed-band model can be improved in comparison with a case where a dedicated normalization parameter set is used for each sampling condition.

Note that the languages to which the novel technique may be applicable is not limited and such languages may include, by no means limited to, Arabic, Chinese, English, French, German, Japanese, Korean, Portuguese, Russian, Spanish for instance.

Furthermore, in the described embodiment, it has been described that the model supporting the broadband and narrowband systems is trained by the model construction system 100. However, the number of the sampling conditions to be supported is not limited to two (i.e., narrowband and broadband). The model construction system 100 according to the exemplary embodiment of the present can be extended to handle more than three sampling conditions. Furthermore, the mixed-band model is described as example of the model that supports plurality of the sampling condition. However, the sampling condition may include other condition such as audio bit depth, to name but a few, in addition to or in place of the sampling frequency.

Note that in the embodiments described above, the neural network used for the acoustic model 210 is a target of the novel model construction technique. However, since the neural network is one of the most promising models used in a variety of recognition tasks in addition to the speech recognition, any neural network used in other field such as image recognition processing, motion recognition processing, etc., may also be a target of the novel model construction technique according to one or more embodiment of the present invention.

Figure 7:
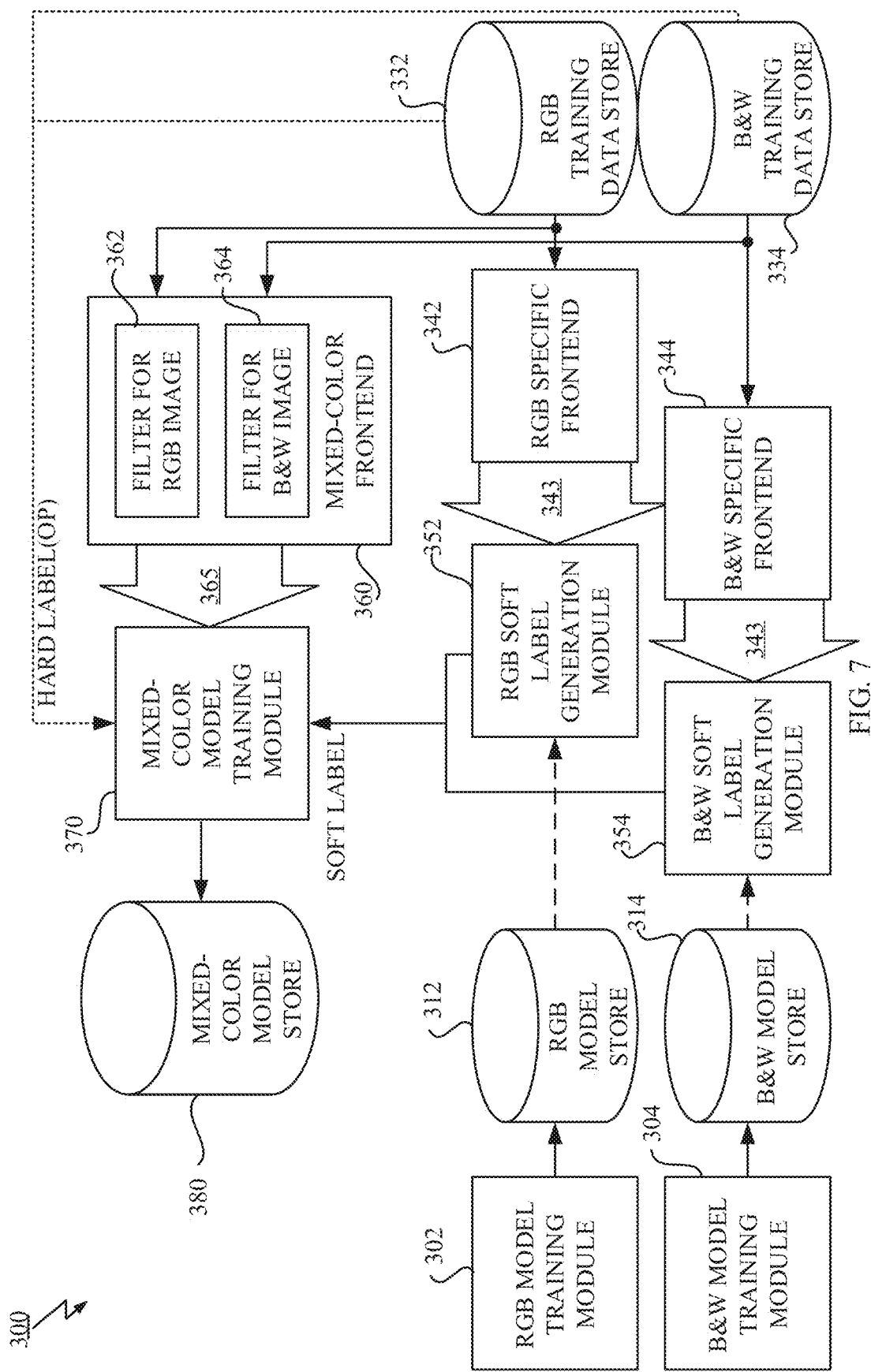
FIG. 7 illustrates a block diagram of a mixed-color model construction system for image recognition according to other exemplary embodiment of the present invention.
Figure 8:
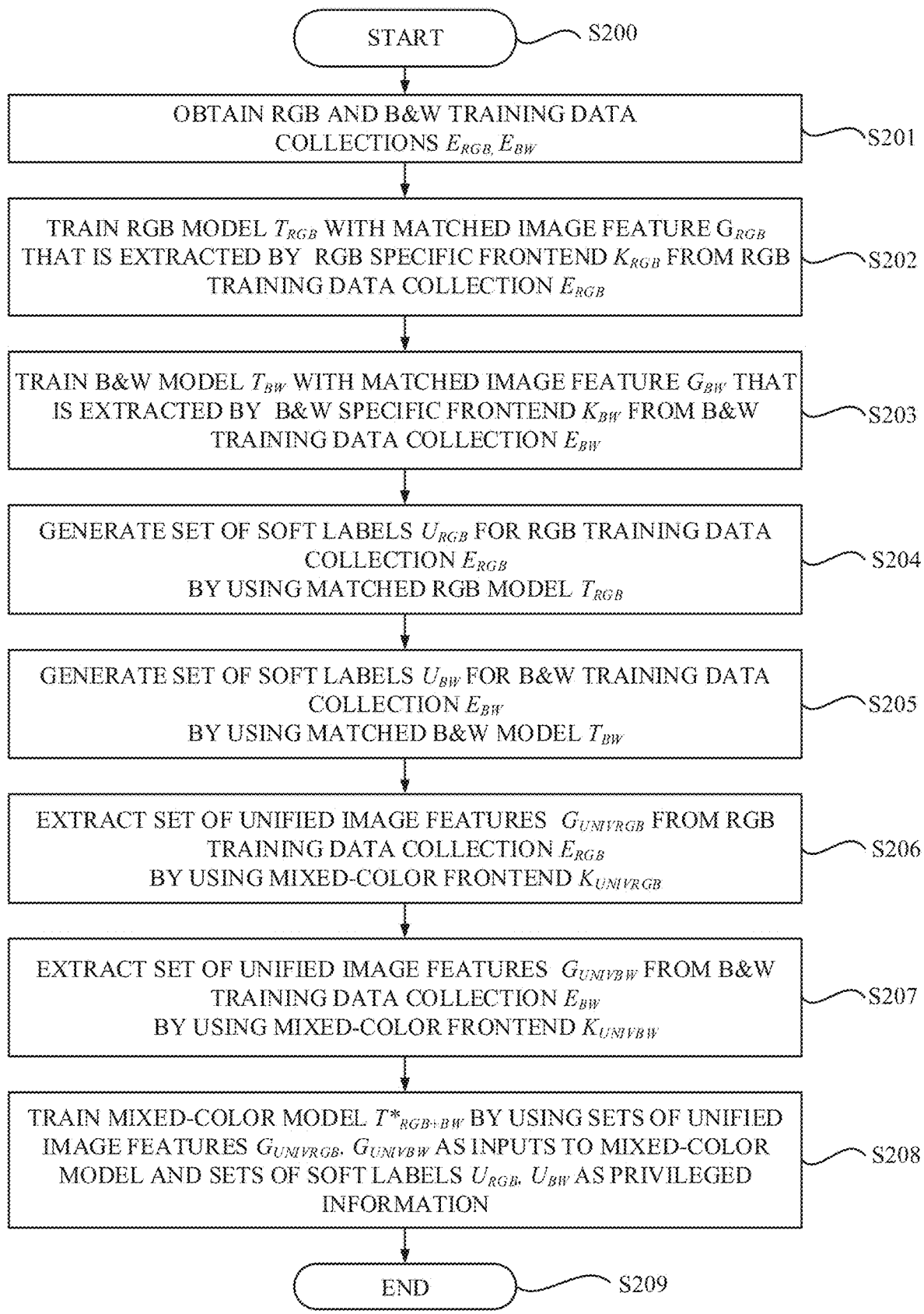
FIG. 8 is a flowchart depicting a process for constructing a mixed-color model for image processing according to the other exemplary embodiment of the present invention.

Now referring to the series of FIGS. 7 and 8, a mixed-color model construction system 300 and a process for constructing the mixed-color model for image recognition according to other exemplary embodiment of the present invention is described. In contrast to the aforementioned embodiments, the teacher and student models are image recognition models and the input signal is image signal, which may be a whole or a part of a still image or a frame in a video.

FIG. 7 illustrates a block diagram of the mixed-color model construction system 300 for the image recognition.

The mixed-color model construction system 300 is a computer system that constructs a mixed-color model for the image recognition in a framework of teacher and student learning where teacher models are used to generate soft labels and a student model is trained using the soft labels generated by the teacher models.

The image recognition is a task for classifying the image or pixel into image classes, for examples, /grass/, /sky/, /car/, /cat/, etc. A neural network model for the image recognition typically includes an input layer that receives an image patch; one or more hidden layers that processes the image patch; and an output layer that outputs a probability distribution over image classes based on activations of the hidden layers. The images may include any image data obtained by shooting a video or stilling a picture that captures any real world objects in a view of a camera device.

There is a plurality of image types, typically including RGB color mode and black and white (Hereinafter, abbreviated as "B&W") mode. Note that the term "black and white" or "B&W" does not necessarily mean that the image consists of binary values (black "0" and white "1"). Grayscale image also falls into the category of the black and white image. Similarly, RGB color image may include images of any bit depth.

An image recognition model may be prepared for each color mode. In contrast, the mixed-color model construction system 300 is configured to train a mixed-color model that is capable of handling input image signals in both of the black and white color mode and the RGB color mode. For this purpose, there are plurality of lines, including a RGB line and a B&W line, for generating soft labels that are used to train the mixed-color model, as illustrated in FIG. 7.

More specifically, the mixed-color model construction system 300 includes, as the RGB line, a RGB model training module 302 that trains a RGB model as one of the teacher models; a RGB model store 312 that is used for storing the trained RGB model; a RGB training data store 332 that stores a collection of RGB color training data; a RGB specific frontend 342 that extracts image features 343 specifically matched to RGB inputs; and a RGB soft label generation module 352 that generates a set of soft labels that can be used to train the mixed-color model together with the corresponding collection of the RGB color training data.

As the B&W line, the mixed-color model construction system 300 also includes a B&W model training module 304 for training a B&W model as one of the teacher models; a B&W model store 314 used for storing the trained B&W model; a B&W training data store 334 for storing a collection of B&W image training data; a B&W specific frontend 344 for extracting image features 343 specifically matched to B&W inputs; and a B&W soft label generation module 354 for generating a set of soft labels that can be used to train the mixed-color model together with the corresponding collection of the B&W training data.

The mixed-color model construction system 300 further includes a mixed-color frontend 360 that can extract unified image features from both of the RGB and B&W training data stored in the training data stores 332, 334; a mixed-color model training module 370 that trains a student model as the mixed-color model by using the soft label sets that are generated by the soft label generation modules 352, 354; and a mixed-color model store 380 that is used for storing the mixed-color model trained by the mixed-color model training module 370.

The mixed-color frontend 360 is an unified feature extractor that extracts an unified feature 365 from a RGB or B&W image signal. The mixed-color frontend 360 is at least partially common to the RGB and B&W images.

The mixed-color frontend 360 shown in FIG. 7 includes a first filter 362 for the RGB image and a second filter 364 for the B&W image. Since the mixed-color model is a model that can be shared for both of the RGB and B&W images, the mixed-color frontend 360 absorbs partially such difference between the RGB and B&W images by using these filters 362, 364 in terms of the color modes.

The mixed-color frontend 360 is configured to extract unified features from an input image signal in the RGB or B&W image by using the first and second filters 362, 364 so as to unify physical meanings of features between the RGB and B&W images.

It is assume that RGB-color image is processed with 3 blocks (channels) as inputs while B&W image is processed with 1 block as inputs. In the mixed-color model construction system 300, the image signal is represented by four blocks, including R (Red), G (Green), B (Black or Blue) and K (blacK) blocks. When the RGB image is processed in mixed-color model, 0 padding is done for remaining one K block. Whereas, when the block-and-white image is processed in mixed-color model, 0 padding is done for remaining three RGB blocks.

A training data stored in the RGB or B&W training data store 332/334 is fed into the corresponding teacher model via the corresponding color-specific frontend 342/344 to generate a set of output as the soft labels, which are then fed into the mixed-color model training module 370. Meanwhile, the same training data is fed into the mixed-color model training module 370 via the mixed-color frontend 360 to train the student model by using the generated soft labels, as the privileged information.

The mixed-color model training module 370 is configured to train the student model as the mixed-color model in a framework of teacher and student learning. The mixed-color model training module 370 receives a set of the unified image features, each of which is extracted by the mixed-color frontend 360 from each training data, and a set of the soft labels, each of which is generated by the soft label generation modules 352, 354 from each of the same training data. The mixed-color model training module 370 trains the student model by using the unified image feature and the soft label associated with unified image feature, which are used as an input to the student model and privileged information, respectively, optionally together with hard labels for each training data.

Each of the teacher models and the student model may be any one of standard neural networks, which includes DNN, CNN, RNN based models and a neural network combining features of several neural network types.

In particular embodiments, each of modules 302, 304, 342, 344, 352, 354, 360, 370 of the mixed-color model construction system 300 described in FIG. 7 may be, but not limited to, implemented as a software module in conjunction with hardware components; as a hardware module including electronic circuitry; or as a combination thereof. These modules 302, 304, 342, 344, 352, 354, 360, 370 described in FIG. 7 may be implemented on a single computer system or a computer system distributed over a plurality of computing devices. Also the data and model stores 312, 314, 332, 334, 380 may be provided by any memory device as long as it can be accessed by the module requiring access.

With reference to FIG. 8, a process for constructing a mixed-color model for image processing according to other exemplary embodiment of the present invention is depicted.

As shown in FIG. 8, the process may begin at step S200 in response to receiving, from an operator, a request for initiating a construction process, for example. Note that the process shown in FIG. 8 may be performed by processing circuitry such as one or more processing units.

At step S201, the processing circuitry may obtain the RGB and B&W training data collections $E_{RGB}$, $E_{BW}$, each of which is collected for either one of the RGB and the B&W images.

At step S202, the processing circuitry may train the RGB model $T_{RGB}$ with specifically matched feature $G_{RGB}$ that is extracted by the RGB specific frontend 342 having the filter $K_{RGB}$ from the RGB training data collection $E_{RGB}$ obtained at the step S201 to prepare one teacher model specialized or dedicated for the RGB images.

At step S203, the processing circuitry may train the B&W model $T_{BW}$ with specifically matched feature $G_{BW}$ that is extracted by the B&W specific frontend 344 having the filter $K_{BW}$ from the B&W training data collection $E_{BW}$ obtained at the step S201 to prepare one teacher model specialized or dedicated for the B&W images.

At step S204, the processing circuitry may generate a set of soft labels $U_{RGB}$ for the RGB training data collections $E_{RGB}$ by using the matched RGB model $T_{RGB}$ trained at the step S202. At step S205, the processing circuitry may generate a set of soft labels $U_{BW}$ for the B&W training data collections $E_{BW}$ by using the matched B&W model $T_{BW}$ trained at the step S203.

At step S206, the processing circuitry may extract a set of unified image features $G_{UNIVRGB}$ from the RGB training data collection $E_{RGB}$ by using the mixed-color frontend 360 having the unified filter $K_{UNIVRGB}$. At step S207, the processing circuitry may extract a set of unified image features $G_{UNIVBW}$ from the B&W training data collection $E_{BW}$ by using the mixed-color frontend 360 having the unified filter $K_{UNIVBW}$.

At step S208, the processing circuitry may train the mixed-band model $T_{RGB+BW}$ by using the sets of the unified image features $G_{UNIVRGB}$, $G_{UNIVBK}$ as inputs to the mixed-color model and the sets of the soft labels $U_{RGB}$, $U_{BW}$ as the privileged information.

After performing the training process at S208, the process may proceed to step S209 and end at the step S209. The parameters of the mixed-color student model $T_{RGB+BW}$, which may include weights between each units and biases of each unit in the neural network, are optimized during the process and the finally obtained parameters of the mixed-color student model $T^*_{RGB+BW}$ are stored in the mixed-color model store 380.

As described above, the process for constructing a mixed-color model for the image recognition is almost same as the process for constructing the mixed-band model for the speech recognition shown in FIG. 4 except for the features and the training data.

According to one or more embodiments of the present invention, although it does not necessarily mean that the same is hold in all the embodiments, it is possible to construct a mixed-color model supporting a plurality of color modes by leveraging knowledge obtained from teacher models that are specialized for respective color modes while suppressing performance deterioration of the mixed-color model in each color mode. The training data for one color mode contributes to improvement of performance on other color mode in a complementary manner. Thus, even if the training data for one color mode is biased, it is possible to alleviate such bias by using the training data for other color mode.

Furthermore, the constructed model can replace a plurality of existing models that have been prepared to support the plurality of the color mode, without giving much negative impact. Thereby, computational resources for operating the system that supports the plurality of the color modes can be reduced. The workload for testing the system and performing maintenance of the system can also be reduced.

In the preferable embodiment with the color-specific frontends 342, 344 and the mixed-color frontend 360, even though different feature extraction process is required for each color mode, the novel technique can be applicable.

In the preferable embodiment where each teacher model is trained by using matched features extracted from teacher training data, the performance of the constructed model can be improved in comparison with a case where a feature extractor not well matched to the corresponding color mode is used since the feature extractor best fit to the corresponding color mode can be used to train each teacher model and accordingly the teacher model can be trained in the best conditions.

In the preferable embodiment where the physical meanings of the features are unified between the color modes at the mixed-color frontend 360, the student model can process features that correlate with data of the plurality of the color domains. On the other hand, impact of unifying the physical meanings of the features can be compensated by the soft labels that are generated by the teacher models that use the color-specific frontends 342, 344. Rather, a synergistic effect by using a plurality of training data collections together is obtained for both color modes.

Note that in the aforementioned embodiment, the sampling condition and the color mode are described as examples of the domains. The scope according to one or more embodiments of the present invention can be extended to the any kind of domains, which may have a complementary relationship, from the sampling condition of the input speech signal or the color mode of the input image signal. The term "complementary relationship" means that the plurality of the domains has relationship such that the training data for one domain contributes to the improvement on the performance for other domain, mutually.

A program implementing the model construction system 100 and model construction process described with reference to the series of FIGS. 1-6 according to the exemplary embodiment was coded and executed.

A CNN model with a broadband specific frontend having 16K specific Mel filter banks and a global cms parameter set was prepared as a broadband baseline model. A CNN model with a narrowband specific frontend having 8K specific Mel filter banks and a global cms parameter set was prepared as a narrowband baseline model. A CNN model with a unified frontend having 16K/8K unified Mel filter banks and a global hybrid cms parameter set was prepared as both baseline and mixed-band student models.

Each CNN model included an input layer, convolutional and max pooling layers, fully-connected layers and an output layer. The number of the convolutional layers was 2. The numbers of the localized filters in the convolutional layers were 128 and 256, respectively. The fully-connected layers in the neural network included 4 hidden layers of 1024 hidden units. The number of units in the output layer of the neural network was almost 9300. Each unit in the output layer corresponded to each quinphone HMM state.

15 hours of noisy speech data with manual transcriptions that is so-called Aurora-4 were prepared. To obtain the narrowband training data, audio data of the Aurora-4 was down-sampled from 16 kHz to 8 kHz. A hard label was aligned to each center frame by the forced alignment technique based on standard GMM/HHM.

11 consecutive frames of Log Mel features having 40 frequency banks and its dynamic features (delta and delta-delta features) were used as the acoustic feature. Half part of the filter banks (10 filter banks) corresponding to the high frequency component was padded with zero when calculating the unified acoustic features. The global cms parameter set was calculated for each of the broadband and narrowband systems as the dedicated normalization parameter set. The global hybrid cms parameter set was calculated for both the broadband and narrowband systems as the hybrid normalization parameter set. The means of feature vector after the Mel filter bank calculation was calculated using the whole of the training data.

As for comparative examples (Comparative Examples 1 & 2), a baseline broadband (16K) CNN model and a baseline narrowband (8K) CNN model were trained by using the broadband and narrowband training speech data with the hard labels, respectively. As for other comparative example (Comparative Example 3), a baseline mixed-band CNN model was trained by using the both of the broadband and narrowband training speech data with the hard labels.

As for an example (Example 1), the mixed-band CNN student models initialized with random parameters were trained by the novel model construction process using both of the broadband and narrowband training speech data with the hard label and the soft labels that were obtained from the baseline broadband CNN model (corresponds to Comparative Example 1) and the baseline narrowband CNN model (corresponds to Comparative Example 2) as the teachers.

In the Examples and the Comparative Examples, after the training of the neural network was completed, the parameters of the neural network from the input layer to the output layer were stored. The accuracy of the speech recognition systems that incorporated the obtained neural network as an acoustic model was evaluated for each of the examples and the comparative examples by using several test data sets. The test data set including "clean" and "noisy" data in the Aurora-4 data set were used. WER (Word Error Rate) was utilized as ASR accuracy metric. For Comparative Examples 1 &2, test data matched to the corresponding audio type was used. For Comparative Examples 3 and Example 1, test data of both 16K and 8K (down-sampled from 16 K test data) audio types was used.

Unless otherwise noted, any portions of the speech recognition model except for way of training the acoustic model and configuration of the frontends were approximately identical between the examples and the comparative examples. The final topologies of the CNN model in the examples were identical to that of the comparative examples.

The evaluated results of the examples and the comparative examples are summarized as follow:

TABLE 1

| | | Test Condition | | | | |
| | | wv1 (matched channel condition) | | wv2 (mismatched channel condition) | | |
| Acoustic Model | Training Data | Clean | Noisy | Clean | Noisy | AVG |
| --- | --- | --- | --- | --- | --- | --- |
| Comparative Example 1 (baseline 16K CNN model) | 16K/hard label | 3.8 | 7.7 | 6.6 | 16.0 | 10.9 |

TABLE 1-continued

| | | Test Condition | | | | |
|---|---|---|---|---|---|---|
| | | wv1(matched channel condition) | | wv2(mismatched channel condition) | | |
| Acoustic Model | Training Data | Clean | Noisy | Clean | Noisy | AVG |
| Comparative Example 2 (baseline 8K CNN model) | 8K/hard label | 4.4 | 9.9 | 6.0 | 15.9 | 11.8 |
| Comparative Example 3 (baseline mixed-band CNN model) | 16K + 8K/hard label | 4.0 (16K) | 8.1 (16K) | 6.0 (16K) | 15.4 (16K) | 10.8 (16K) |
| | | 4.4 (8K) | 10.4 (8K) | 6.8 (8K) | 16.7 (8K) | 12.4 (8K) |
| Example 1 (new mixed-band CNN student model) | 16K + 8K/hard & soft labels | 3.7 (16K) | 7.2 (16K) | 5.4 (16K) | 14.5 (16K) | 10.0 (16K) |
| | | 4.1 (8K) | 9.2 (8K) | 5.7 (8K) | 15.1 (8K) | 11.1 (8K) |

As shown in TABLE 1, the baseline band-specific CNN models showed 10.9% (Comparative Example 1) and 11.8% (Comparative Example 2) WER for average. The baseline mixed-band CNN model trained by using the hard label showed 10.8% and 12.4% WER, for average, for the broadband and narrowband test data, respectively. The baseline mixed-band CNN model showed the performance comparable with the baseline broadband specific CNN model (Comparative Example 1) for the broadband test data. But the performance of the baseline mixed-band CNN model for the narrowband test data was degraded in comparison with the baseline narrowband specific CNN model (Comparative Example 2). It is understood that this is because the zero padding for the narrowband data at the frontend leads a loss of information as the whole of the feature vector.

In contrast to the baseline mixed-band CNN model, the new mixed-band CNN student model constructed by the novel model construction process showed 10.0% and 11.1% WER, for average, for the broadband and narrowband test data, respectively, which indicates that the mixed-band CNN student model outperformed the corresponding baseline band-specific CNN models (Comparative Example 1 & 2) for both broadband and narrowband test data.

It is understood that this is because the student model was trained so as to imitate behavior of the teacher models even if there is miss-match in the frontend and the training data for the broadband system contributed to improvement of the performance on the narrowband system and vice versa, in a complementary manner. The impact of the zero padding at the frontend is seemed to be compensated by the soft labels that are generated by the best fit teacher models.

A VGG model was prepared as a teacher model. The VGG teacher model included 10 convolutional layers, with a max-pooling layer inserted after every 3 convolutional layers, followed by 4 fully connected layers. All hidden layers had ReLU non-linearity. Batch normalization was applied to the fully connected layers. The number of units in the output layer of the VGG was almost 9300. Unless otherwise noted, the training data, the test data and the configuration of the acoustic features are same as the case of the CNN.

A broadband (16K) VGG teacher model was trained using the broadband training speech data. A narrowband (8K) VGG teacher model was trained using the down-sampled narrowband training speech data. In this experiment, instead of using the CNN model trained with the hard label as the baseline and as the teacher, the CNN student model that was trained with the VGG teacher model in a framework of the teacher and student learning was used as the baseline and the VGG teacher models were used as the teacher models to train the mixed-band CNN student model.

As for comparative examples (Comparative Examples 4 & 5), a baseline broadband (16K) CNN model and a baseline narrowband (8K) CNN model were trained by using the broadband and narrowband training speech data with the hard label and the soft labels that were generated by the broadband (16K) and narrowband (8K) VGG teacher models in a framework of standard teacher and student learning, respectively.

As for an example (Example 2), the mixed-band CNN student model was trained by the novel model construction process using both of the broadband and narrowband training speech data with the hard label and the soft labels that were obtained from the broadband (16K) VGG teacher model (corresponds to the teacher model for Comparative Example 4) and the narrowband (8K) VGG teacher model (corresponds to the teacher model for Comparative Example 5).

The evaluated results of the examples and the comparative examples are summarized as follow:

TABLE 2

| | | Test Condition | | | | |
|---|---|---|---|---|---|---|
| | | wv1(matched channel condition) | | wv2(mismatched channel condition) | | |
| Acoustic Model | Training Data | Clean | Noisy | Clean | Noisy | AVG |
| Comparative Example 4 (baseline 16K CNN student model trained with 16K VGG teacher model) | 16K/hard & soft labels | 3.4 | 6.5 | 5.5 | 13.6 | 9.2 |

TABLE 2-continued

| | | Test Condition | | | | |
| | | wv1(matched channel condition) | | wv2(mismatched channel condition) | | |
| Acoustic Model | Training Data | Clean | Noisy | Clean | Noisy | AVG |
| --- | --- | --- | --- | --- | --- | --- |
| Comparative Example 5 (baseline 8K CNN student model trained with 8K VGG teacher model) | 8K/hard & soft labels | 3.7 | 8.5 | 5.1 | 13.0 | 9.9 |
| Example 2 (new mixed-band CNN student model trained with 8K and 16K VGG teacher models) | 16K + 8K/hard and soft labels | 3.3 (16K) 3.6 (8K) | 6.5 (16K) 8.3 (8K) | 4.9 (16K) 5.0 (8K) | 12.9 (16K) 13.1 (8K) | 8.9 (16K) 9.8 (8K) |

As shown in TABLE 2, the baseline band-specific CNN student models showed 9.2% (Comparative Example 4) and 9.9% (Comparative Example 5) WER for average. The new mixed-band CNN student model constructed by the novel model construction process showed 8.9% and 9.8% WER, for average, for the broadband and narrowband test data, respectively, which indicates that the mixed-band CNN student model outperformed the corresponding baseline band-specific CNN models (Comparative Example 4 & 5) for both broadband and narrowband test data.

It was demonstrated that a mixed-domain model supporting the plurality of the domains can be constructed as the student model without performance deterioration in any domain. It was confirmed specifically that the speech recognition using the neural network based acoustic model that was trained by the novel model construction process can outperform the baseline band-specific models in both of the broadband and narrowband test data.

Figure 9:
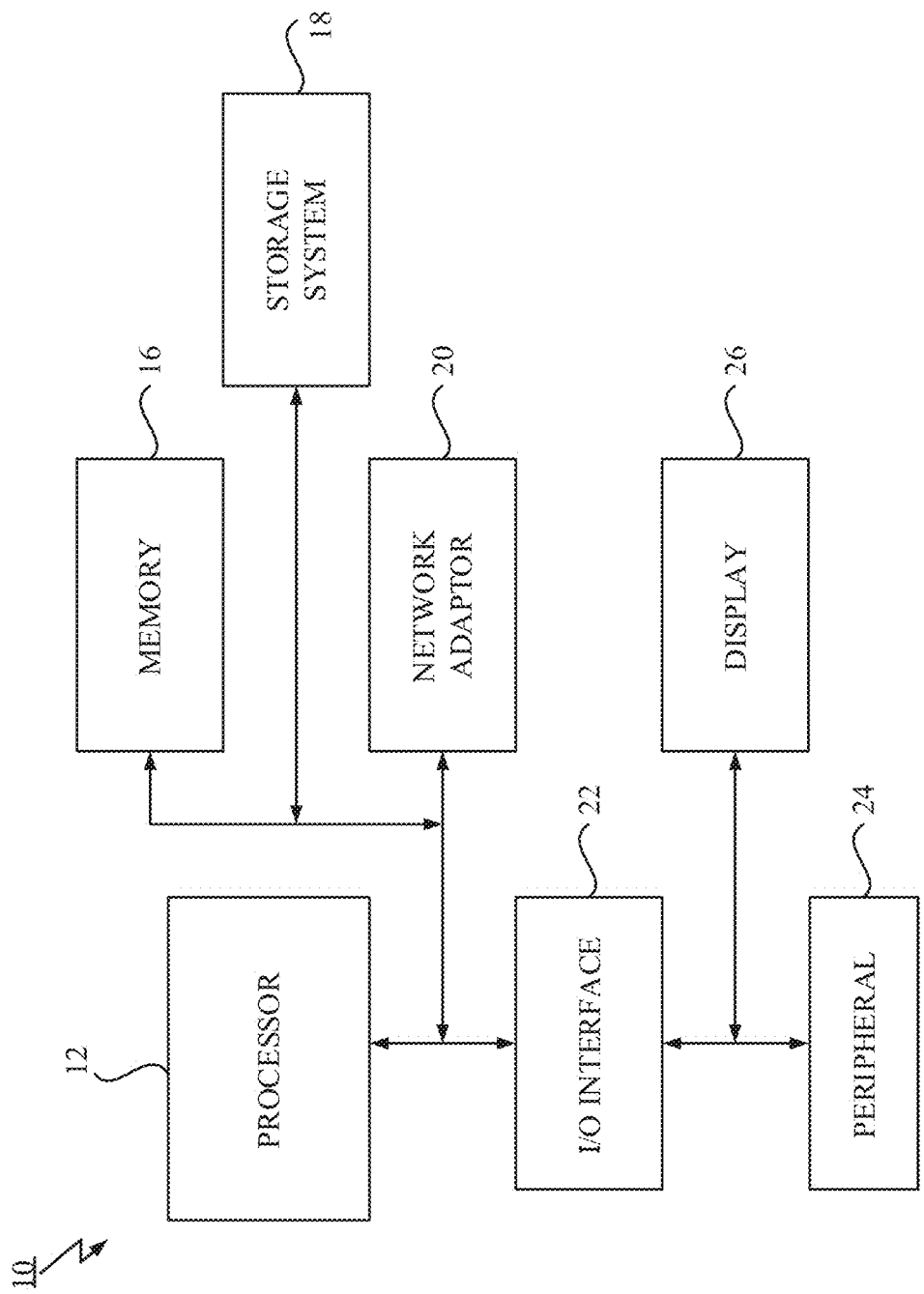
FIG. 9 depicts a schematic of a computer system according to one or more embodiments of the present invention.

Referring now to FIG. 9, a schematic of an example of a computer system 10, which can be used for the mixed-band model construction system 100, the mixed-color model construction system 200, and/or the speech recognition system 200, is shown. The computer system 10 shown in FIG. 9 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9, the computer system 10 is shown in the form of a general-purpose computing device. The components of the computer system 10 may include, but are not limited to, a processor (or processing circuitry) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for constructing a model supporting a plurality of domains, the method comprising:
   preparing a plurality of teacher models, each teacher model being specialized for different one of the plurality of the domains;
   obtaining a plurality of training data collections, each of the plurality of training data collections being collected for a different one of the plurality of the domains;
   inputting training data from each of the plurality of training data collections into a corresponding one of the plurality of the teacher models to generate a plurality of soft label sets; and
   training a student model using the plurality of the soft label sets.

2. The method of claim 1, wherein each teacher model is connected to a matched feature extractor for corresponding one of the plurality of the domains and the student model is connected to a unified feature extractor, the unified feature extractor being common at least partially to the plurality of the domains.

3. The method of claim 2, wherein the matched feature extractor of each teacher model extracts a matched feature from an input signal in the corresponding one of the plurality of the domains and the preparing of the plurality of the teacher models comprises:
   training each teacher model using matched features extracted by the matched feature extractor from teacher training data for the corresponding one of the plurality of the domains.

4. The method of claim 2, wherein the unified feature extractor of the student model extracts an unified feature from an input signal in any one of the plurality of the domains by unifying physical meanings of features between the plurality of the domains.

5. The method of claim 4, wherein the unified feature extractor of the student model includes a hybrid normalization parameter set used in common for the plurality of the domains.

6. The method of claim 4, wherein a first unified feature extracted for a first domain has a plurality of elements and a second unified feature extracted for a second domain has a part of elements corresponding to a part of the elements for the first domain and a remaining part of elements corresponding to a remaining part of the elements for the first domain and having a predetermined value.

7. The method of claim 2, wherein the training of the student model comprises:
   extracting an unified feature by the unified feature extractor from training data in each of the plurality of training data collections; and
   using the unified feature and a soft label associated with the unified feature as an input to the student model and privileged information, respectively.

8. The method of claim 2, wherein the plurality of the teacher models and the student model are acoustic models and the plurality of the domains has difference in sampling condition of an input speech signal.

9. The method of claim 2, wherein the plurality of the teacher models and the student model are image processing models and the plurality of the domains has difference in color mode of an input image signal.

10. The method of claim 1, wherein the student model is a neural network based model.

11. A computer system for constructing a model supporting a plurality of domains, the computer system comprising:
   a memory storing program instructions;
   a processing circuitry in communications with the memory for executing the program instructions, wherein the program instructions are configured to:
   prepare a plurality of teacher models, wherein each teacher model is specialized for different one of the plurality of the domains;
   obtain a plurality of training data collections, wherein each of the plurality of training data collections is collected for a different one of the plurality of the domains;
   input training data from each of the plurality of training data collections into a corresponding one of the plurality of the teacher models to generate a plurality of soft label sets; and
   train a student model using the plurality of the soft label sets.

12. The computer system of claim 11, wherein each teacher model is connected to a matched feature extractor for corresponding one of the plurality of the domains and the student model is connected to a unified feature extractor, the unified feature extractor being common at least partially to the plurality of the domains.

13. The computer system of claim 12, wherein the matched feature extractor of each teacher model extracts a matched feature from an input signal in the corresponding one of the plurality of the domains and the processing circuitry is further configured to:
   train each teacher model using matched features extracted by the matched feature extractor from teacher training data for the corresponding one of the plurality of the domains to prepare the plurality of the teacher models.

14. The computer system of claim 12, wherein the unified feature extractor of the student model extracts an unified feature from an input signal in any one of the plurality of the domains by unifying physical meanings of features between the plurality of the domains.

15. The computer system of claim 14, wherein the unified feature extractor of the student model includes a hybrid normalization parameter set used in common for the plurality of the domains.

16. The computer system of claim 12, wherein the processing circuitry is further configured to:
extract an unified feature by the unified feature extractor from training data in each of the plurality of training data collections; and
use the unified feature and a soft label associated with the unified feature as an input to the student model and privileged information, respectively.

17. The computer system of claim 12, wherein the plurality of the teacher models and the student model are acoustic models and the plurality of the domains has difference in sampling condition of an input speech signal.

18. A computer program product constructing a model supporting a plurality of domains, the computer program product comprising a computer readable storage medium having program instructions embodied therewith, the program instructions executable by a computer to cause the computer to perform a method comprising:
preparing a plurality of teacher models, each teacher model being specialized for different one of the plurality of the domains;
obtaining a plurality of training data collections, each of the plurality of training data collections being collected for a different one of the plurality of the domains;
inputting training data from each of the plurality of the training data collections into a corresponding one of the plurality of the teacher models to generate a plurality of soft label sets; and
training a student model using the plurality of the soft label sets.

19. The computer program product of claim 18, wherein each teacher model is connected to a matched feature extractor for corresponding one of the plurality of the domains and the student model is connected to a unified feature extractor, the unified feature extractor being common at least partially to the plurality of the domains.

20. The computer program product of claim 19, wherein the matched feature extractor of each teacher model extracts a matched feature from an input signal in the corresponding one of the plurality of domains and the preparing of the plurality of the teacher models comprises:
training each teacher model using matched features extracted by the matched feature extractor from teacher training data for the corresponding one of the plurality of the domains.

21. The computer program product of claim 19, wherein the unified feature extractor of the student model extracts an unified feature from an input signal in any one of the plurality of the domains by unifying physical meanings of features between the plurality of the domains.

22. The computer program product of claim 21, wherein the unified feature extractor of the student model includes a hybrid normalization parameter set used in common for the plurality of the domains.

23. The computer program product of claim 19, wherein the training of the student model comprises:
extracting an unified feature by the unified feature extractor from training data in each of the plurality of training data collections; and
using the unified feature and a soft label associated with the unified feature as an input to the student model and privileged information, respectively.

24. The computer program product of claim 19, wherein the plurality of the teacher models and the student model are acoustic models and the plurality of the domains has difference in sampling condition of an input speech signal.

* * * * *